United States Patent [19]
Mohr et al.

[11] Patent Number: 6,066,232
[45] Date of Patent: May 23, 2000

[54] METHOD AND VAPORIZER FOR VAPORIZING OXIDATION-SENSITIVE COMPOUNDS

[75] Inventors: Jürgen Mohr, Grünstadt, Germany; Frans Vansant, Kalmthout, Belgium; Axel Werner Polt, Deidesheim, Germany; Stephan Scholl, Bad Dürkheim, Germany; Siegfried Krüger, Speyer, Germany; Hartmut Staatz, Heidelberg, Germany

[73] Assignee: BASF Aktiengesellschaft, Ludwigshafen, Germany

[21] Appl. No.: 09/117,213

[22] PCT Filed: Jan. 20, 1997

[86] PCT No.: PCT/EP97/00245

§ 371 Date: Jul. 24, 1998

§ 102(e) Date: Jul. 24, 1998

[87] PCT Pub. No.: WO97/26970

PCT Pub. Date: Jul. 31, 1997

[30] Foreign Application Priority Data

Jan. 25, 1996 [DE] Germany ............... 196 02 640

[51] Int. Cl.[7] ............... B01D 1/06; B01D 1/22; C07C 27/26
[52] U.S. Cl. ............... 159/13.3; 159/13.1; 159/13.2; 159/43.1; 159/49; 159/DIG. 15; 203/1; 203/86; 203/89; 202/236; 202/267.1; 568/913; 568/868
[58] Field of Search ............... 203/86, 89, 31, 203/71, 1; 202/235, 237, 236, 267.1; 159/44, 49, 13.1–13.3, DIG. 15, 43.1, 27.1, 27.4, 28.1, 26.1, DIG. 16; 568/868, 913

[56] References Cited

U.S. PATENT DOCUMENTS

| | | |
|---|---|---|
| 3,997,389 | 12/1976 | Winkler ............... 159/49 |
| 4,264,538 | 4/1981 | Moore et al. ............... 261/97 |
| 4,298,041 | 11/1981 | Laganá et al. ............... 165/DIG. 19 |
| 4,404,928 | 9/1983 | Perot et al. ............... 122/32 |
| 4,842,055 | 6/1989 | Ohtsu ............... 165/174 |
| 4,925,526 | 5/1990 | Havukainen ............... 159/13.3 |
| 5,770,020 | 6/1998 | Koistinen et al. ............... 202/172 |
| 5,904,807 | 5/1999 | Ramm-Schmidt et al. ............... 159/43.1 |

FOREIGN PATENT DOCUMENTS

| | | |
|---|---|---|
| 3338488 | 5/1984 | Germany . |
| 3643816 | 12/1986 | Germany . |
| 3904357 | 2/1989 | Germany . |
| 378290 | 5/1960 | Switzerland . |
| 92/20419 | 11/1992 | WIPO . |
| 95/05226 | 2/1995 | WIPO . |

OTHER PUBLICATIONS

*Ullmann's Enz.*, vol. 2, pp. 650–653.

*Ind. Org. Chem.*, 3 Aufl., pp. 161–162.

*Patent Abst. of Japan*, vol. 9, No. 184 (JP 60054702; Mar. 29, 1985).

*Primary Examiner*—Virginia Manoharan
*Attorney, Agent, or Firm*—Keil & Weinkauf

[57] ABSTRACT

The invention relates to a process for evaporating a liquid containing vaporizable oxidation-sensitive compounds in an evaporator in which the liquid is brought into contact with a heated solid surface for evaporation, by a process in which direct contact between the resulting vapor phase and the heated solid surface is substantially avoided. It also directed to an evaporator composed of a heatable solid surface (16), an apparatus (2, 3) for heating the solid surface and an apparatus (10) for feeding a liquid containing vaporizable compounds to the heatable solid surface, wherein the apparatus for feeding the liquid is designed and arranged in the evaporator in such a way (12, 14, 18) that direct contact between a resulting vapor phase and the heatable solid surface is substantially avoided.

6 Claims, 3 Drawing Sheets

METHOD AND VAPORIZER FOR VAPORIZING OXIDATION-SENSITIVE COMPOUNDS

The present invention relates to a process for evaporating a liquid containing vaporizable oxidation-sensitive compounds.

A variety of evaporators are used in industry for a very wide range of applications. Examples are kettle evaporators, tubular evaporators, thin-film evaporators, short-path evaporators, plate evaporators and special evaporators for very highly viscous solutions and for encrusting and corrosive solutions (cf. for example Ullmanns Enzyklopädie der Technischen Chemie, 4th Edition, Vol. 2, pages 650–663).

The tubular evaporators include self-circulation and forced-circulation evaporators, inclined evaporators, fast-circulation evaporators, through-circulation evaporators, rising-film evaporators and also downflow or falling-film evaporators.

These evaporators are also used for evaporating liquids containing vaporizable oxidation-sensitive compounds.

Such a liquid is obtained, for example, in the preparation of glycols, in particular ethylene glycol. In the industrial process for the preparation of ethylene glycol, ethylene oxide is reacted with a roughly tenfold molar excess of water, either at atmospheric pressure and 50–70° C. in the presence of a catalyst or at a reduced pressure of 20–40 bar and 140–230° C. without a catalyst. The preparation of ethylene glycol is carried out almost exclusively in a reactor downstream of the direct oxidation of ethylene. The aqueous crude glycol solution obtained is concentrated to about 30% in evaporators and subjected to fractional distillation in a plurality of columns at reduce pressure (K. Weissermel and H. -J. Arpe, Industrielle organische Chemie, VCH Verlagsgesellschaft, 3rd Edition, page 161).

Glycols are oxidation-sensitive, particularly at relatively high temperature. They are oxidized in particular to aldehydes. For certain uses, for example for the preparation of polyesters, particularly high purity of the ethylene glycol is required (99.9% by weight). These glycols must comply with specific values for the boiling limits, the water content and the acid number (cf. Ullmanns Enzyklopädie der Technischen Chemie, 4th Edition, Vol. 8, pages 200–210; K. Weissermel and H. -J. Arpe, loc cit, page 162).

It is furthermore known that a thermally gentle distillation can be carried out by means of a falling-film evaporator connected to a distillation column in order to obtain heat-sensitive products, the heat-sensitive product being obtained by removing the falling-film evaporator discharge separately from the circulation stream taken off from the distillation column. This distillation process leads to a reduction in the boiling point of the mixture to be separated and hence to thermally gentle evaporation (cf. German Patent 3,338,488).

It is an object of the present invention to provide a process for evaporating a liquid containing vaporizable oxidation-sensitive compounds, in which the oxidation of the oxidation-sensitive compound is avoided.

It is a further object of the present invention to provide a process for evaporating a liquid containing vaporizable oxidation-sensitive compounds, in which the evaporation is carried out under gentle conditions.

It is a further object of the present invention to provide a process for evaporating a liquid containing vaporizable oxidation-sensitive compounds, in which the evaporated liquid is rectified.

It is a further object of the present invention to provide a process for evaporating a liquid containing vaporizable oxidation-sensitive compounds, in which the oxidation-sensitive compound is obtained in a very high yield and there is only very little contamination with oxidation products.

It is a further object of the present invention to provide a process for evaporating a liquid containing vaporizable oxidation-sensitive compounds in an evaporator, in which the oxidation of the oxidation-sensitive compound in the evaporator is avoided.

It is a further object of the present invention to provide an evaporator which enables the abovementioned processes to be carried out.

We have found that the abovementioned objects are achieved by a process for evaporating a liquid containing vaporizable oxidation-sensitive compounds in an evaporator, in which the liquid is brought into contact with a heated solid surface for evaporation, wherein direct contact between a resulting vapor phase and the heated solid surface is substantially avoided, and by a processed for evaporating a liquid containing vaporizable oxidation-sensitive compounds in an evaporator, in which the liquid is brought into contact with a heated solid surface for evaporation, wherein essentially the total heated solid surface is completely wet with the liquid, respectively.

An example of a liquid which can be evaporated in the novel process or by means of the novel evaporator is a liquid containing glycol, preferably ethylene glycol.

In the known processes for the preparation of ethylene glycol, an aqueous ethylene glycol solution is obtained and is then concentrated in a plurality of stages. The crude glycol is then purified by fractionation.

As in the case of all alcohols, ethylene glycol too is sensitive to thermal oxidation (autoxidation) as well as catalytic oxidation. The oxidation products are aldehydes (glycolaldehyde, glyoxal, formaldehyde, acetaldehyde), as well as the corresponding acids.

Particularly when ethylene glycol is used in the polyester preparation, the presence of these oxidation products is very undesirable and must, where possible, be avoided.

The distillation methods and apparatuses known for purification of the ethylene glycol are described in the literature stated at the outset. In general, first water, then glycol and then the higher glycol ethers are obtained continuously in a series of columns connected one behind the other.

For corrosion reasons, it is usually necessary to establish a certain pH in the weakly alkaline range in the column feeds, which is achieved, as a rule, by introducing alkalis.

Since the vapor spaces of such distillation apparatuses are also sensitive to corrosion, alkalis must be used here too with the aid of special spray techniques. However, ammonia, which is itself gaseous and thus more easily distributed, is particularly preferably used.

Evaporators which may be used for these distillation apparatuses are various evaporators as described above. In particular, falling-film evaporators, circulation evaporators, tubular evaporators, through-circulation evaporators, thin-film evaporators and plate evaporators may be used, falling-film evaporators being preferred.

Carbon steel is usually used for the production of distillation apparatuses on the industrial scale.

Owing to the high boiling point of ethylene glycol (197.6° C.) and its homologs, the evaporation is carried out, as a rule, under reduced pressure.

Under reduced pressure, however, every distillation apparatus, regardless of its size, has a certain leakage rate, ie. leaks through which gases from the surrounding atmosphere enter the apparatus.

Thus, atmospheric oxygen too generally enters the reduced-pressure distillation apparatus and permits the formation of the abovementioned oxidation products of the glycol.

In certain cases, very great increases in the aldehyde contents of the distilled glycol were found in industrial plants and could not be readily explained.

We have found, according to the invention, that the oxidation of glycol in the distillation apparatus is very greatly promoted by contact of glycol in the vapor phase with iron particles, as are inevitably entrained in significant amounts in the liquid stream in a plant consisting of carbon steel. These iron particles or iron oxide particles, such as magnetite particles, can act as a catalyst in the oxidation of glycol vapor. This catalytic oxidation is substantially faster than the autoxidation, ie. the direct reaction of glycol with oxygen without a catalyst.

We have furthermore found, according to the invention, that the formation of a large amount of aldehyde as a result of glycol oxidation was absent when the iron or iron oxide particles were not in direct contact with the vapor phase from the evaporator, for example when the iron particles or magnetite particles were present below the liquid surface in the bottom product of the distillation.

In the catalytic oxidation in the vapor phase over iron, corrosion of the iron surfaces occurred at the same time, resulting in the formation of, primarily, magnetite.

We have found, according to the invention, that the oxidation of the glycol or other oxidation-sensitive compounds in an evaporator can be prevented if direct contact between a vapor phase formed and the heated solid surfaces of the evaporator on which the liquid is evaporated is substantially avoided.

This ensures that the vapor phase cannot be in contact with iron particles or iron oxide particles, such as magnetite particles.

In an embodiment of the invention, this is achieved if essentially the total heated solid surface of the evaporator is always completely wet with the liquid to be evaporated. This avoids contact of the product-side vapor phase with the heated solid surfaces, as well as deposition of any iron particles or iron oxide particles entrained in the liquid on the heated solid surface, with the result that contact between these particles and the vapor phase would be permitted. Essentially the total heated solid surface is preferably to be understood as meaning the surface which is heated by the heating medium, for example condensing steam or another suitable heat transfer medium. In an embodiment of the invention, such solid surfaces of the evaporator need not be in contact with the liquid to be evaporated if heating by the heating medium, eg. steam, is prevented by means of suitable apparatuses.

In an embodiment of the invention, those heated solid surfaces of the evaporator which, owing to suitable apparatuses, the vapor of the evaporated liquid cannot reach and which thus cannot be in contact with the vapor phase of the product need not be in contact with the liquid to be evaporated.

In a preferred embodiment, the heated solid surface of the evaporator consists of corrosion-resistant steel. This serves for avoiding surface oxidation (formation of a magnetite layer). By means of this measure, contact of vapor with iron particles or iron oxide particles, such as magnetite particles is furthermore prevented.

Evaporator

The novel process can be carried out in an evaporator comprising a heatable solid surface, an apparatus for heating the solid surface and an apparatus for feeding a liquid containing vaporizable compounds to the heatable solid surface, wherein the apparatus for feeding the liquid is designed and arranged in the evaporator in such a way that direct contact between the resulting vapor phase and the heatable solid surface is substantially avoided.

In an embodiment of the invention, the novel process can be carried out in an evaporator comprising a heatable solid surface, an apparatus for heating the solid surface and an apparatus for feeding a liquid containing vaporizable compounds to the heatable solid surface, wherein the apparatus for feeding the liquid is formed and is arranged in the evaporator in such a way that essentially the total heatable solid surface is wet with the liquid.

In an embodiment of the invention, the heated solid surface consists of corrosion-resistant steel.

According to the invention, the evaporator may be designed as a falling-film evaporator, self-circulation or forced-circulation evaporator, tubular evaporator, through-circulation evaporator, thin-film evaporator, rising film evaporator or plate evaporator, preferably in the form of a falling-film evaporator. The heatable solid surface may have any desired geometry, provided that heat transfer is possible. The surface may have different shapes and may be, for example, in the form of a tube which is smooth or provided with surface structuring and which may have, for example, a circular, oval or other cross-section. For example, it may be in the form of a ribbed tube. It may also be in the form of one or more plates.

In an embodiment of the invention, the evaporator furthermore comprises an apparatus in which the evaporator is designed as a falling-film evaporator, self-circulation or forced-circulation evaporator, tubular evaporator, through-circulation evaporator, thin-film evaporator, rising film evaporator or plate evaporator, preferably in the form of a falling-film evaporator.

In an embodiment of the invention, the apparatus for feeding the liquid comprises a process wherein the evaporator is furthermore provided with an apparatus for recycling liquid flowing away from the surface in the evaporator.

In an embodiment of the invention, the evaporator may be in the form of a falling-film evaporator having an upper and a lower tube plate, wherein the upper and/or the lower tube plate of the falling-film evaporator is thermally insulated.

This is illustrated in more detail below in the Example.

The novel evaporator may be used as the bottom evaporator of a rectification column, and the bottom evaporator and the rectification column may have separate bottoms. This too is illustrated in more detail in the Example.

Oxidation-sensitive compounds

The novel process can be used for any desired vaporizable oxidation-sensitive compounds, in particular those which may undergo oxidation during evaporation. In an embodiment of the invention, the vaporizable oxidation-sensitive compounds are those which are catalytically oxidized in the vapor phase over iron particles or iron oxide particles, in particular magnetite particles. The oxidation of these compounds during the evaporation can preferably be prevented by the novel process.

Examples of the compounds which may be used according to the invention are alcohols, in particular aliphatic alcohols, such as straight-chain or branched alcohols of 1 to 20, preferably 1 to 10, particularly preferably 1 to 4, carbon atoms. Suitable examples are methanol, ethanol, n-propanol, isopropanol, n-butanol and isobutanol. A further class of vaporizable oxidation-sensitive compounds comprises the diols, in particular the aliphatic diols. Examples of these are diols of 2–20, preferably 2–10, in particular 2–5, carbon atoms. Examples are ethylene glycol, propylene glycol and butylene glycol. Ethylene glycol is particularly preferably used.

According to an embodiment of the invention, it is furthermore possible to use polyols, in particular aliphatic polyols. A typical example of a polyol is glycerol.

Further examples of compounds which may be used are aromatic compounds, such as phenol or aniline.

According to an embodiment of the invention, the vaporizable oxidation-sensitive compounds can be fed to the evaporator in pure form. If necessary, they may contain impurities or byproducts. According to a further embodiment of the invention, the vaporizable oxidation-sensitive compounds are fed to the evaporator in at least one liquid, usually in a reaction medium or solvent used. The liquid may also consist of a product mixture.

As a rule, the liquid used is the medium in which the oxidation-sensitive compound to be evaporated is obtained in the synthesis. According to an embodiment in which a diol, in particular ethylene glycol, is used, this is mainly water. The vaporizable oxidation-sensitive compound, if necessary in a liquid containing it, is fed to the evaporator by evaporating it by contact with a heated solid surface.

According to an embodiment of the invention, the evaporation takes place under reduced pressure, and particularly when the vaporizable oxidation-sensitive compound has a high boiling point. For example, the evaporation of ethylene glycol takes place under reduced pressure, usually at 50–300, typically about 200, mbar.

Particularly in the case of evaporation under reduced pressure, there is a danger that atmospheric oxygen may penetrate into the evaporator through leaks in the apparatus and may promote oxidation of the oxidation-sensitive compounds.

According to an embodiment of the invention, the liquid in the evaporator takes the form of a circulating bottom product, particularly when the total feed is not evaporated in the evaporator.

The novel process is illustrated below by an example of a preferred embodiment.

The preferred embodiment is explained with reference to the Figures, in which

DESCRIPTION OF THE PREFERRED EMBODIMENTS

The preferred embodiment of the evaporation system described below is suitable for carrying out the novel process, in particular for evaporating and purifying aqueous liquids containing ethylene glycol.

The evaporator used is a falling-film evaporator which permits low thermal stress on the product owing to the short residence time at high temperature, the small pressure loss and consequently the small increase in the boiling point relative to isobaric conditions and the small driving temperature difference between product and heating medium.

In the present case, the falling-film evaporator is operated by a procedure with separate bottom. In suitable material systems, for example the ethylene glycol/water system, this avoids an excessive increase in the temperature of the bottom product with unchanged quality of the bottom product. The procedure with separate bottom is described in detail in German Patent 3,338,488.

Figure 1:
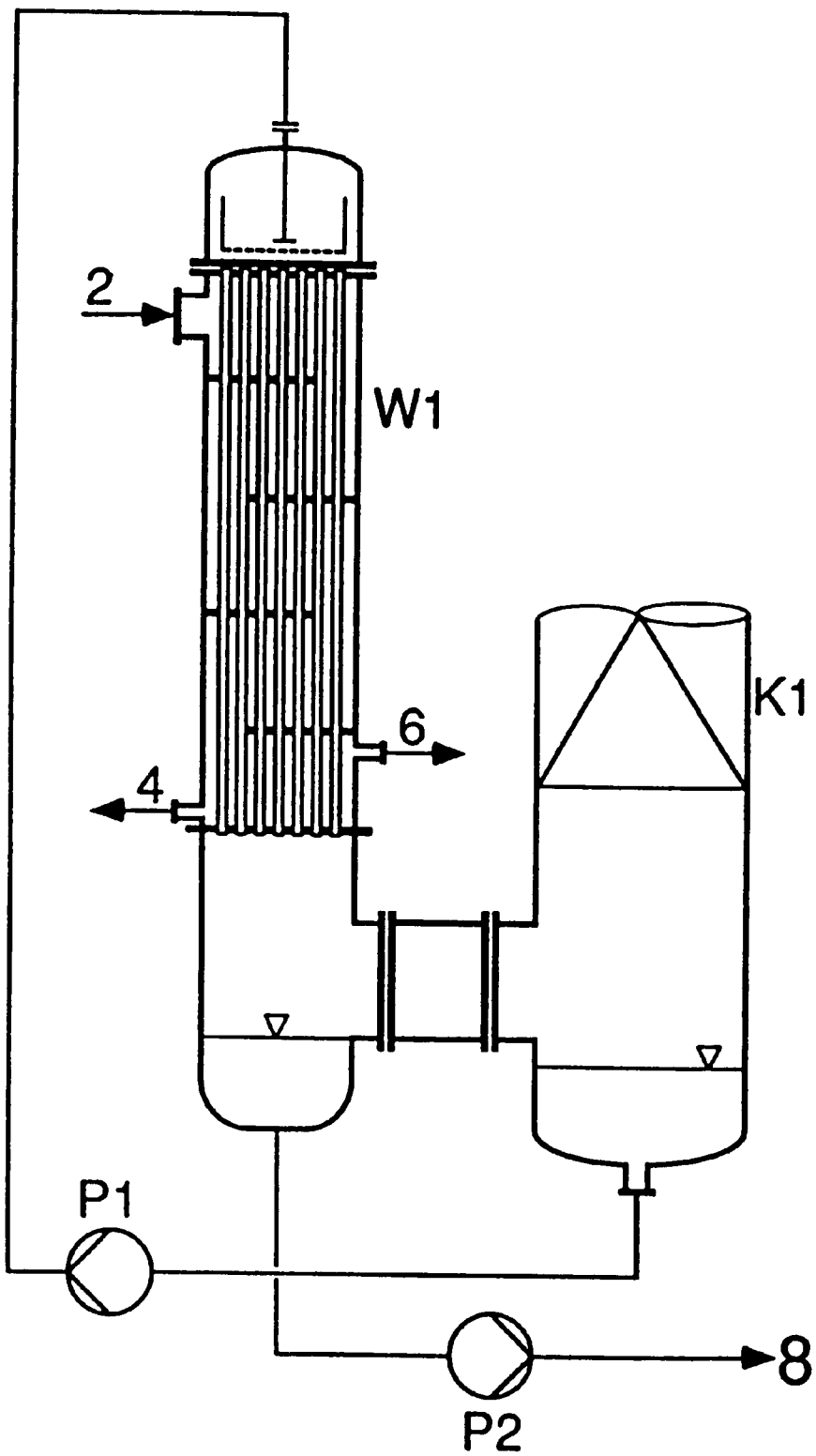
FIG. 1 schematically shows the connection of a column and a falling-film evaporator having separate bottoms.

The connection of the falling-film evaporator with the rectification column is shown in FIG. 1. Here, W1 is the falling-film evaporator having an inlet 2 for heating steam and outlet 4 for condensate and 6 for uncondensed gases, K1 is the rectification column, only the lower part of which is shown, P1 is the pump for feeding the bottom product of the column to the distributing means at the upper tube plate of the falling-film evaporator W1 and P2 is the pump for discharging the bottom product 8 from the falling-film evaporator.

The bottom product of the rectification column K1 is fed via pump P1 to the distributing means at the upper tube plate of the falling-film evaporator W1, in which a number of tubes are arranged vertically, as shown. The falling-film evaporator is heated by means of heating steam 2, condensate (4) and uncondensed gases (6) being removed separately. The bottom product of the falling-film evaporator is taken off via pump P2. The circulation stream of the bottom product comprising the liquid flowing away from the lowermost baffles of the column to the falling-film evaporator via pump P1 must be controlled in such a way that all evaporator tubes are adequately supplied with liquid. The amount of liquid fed must be sufficient to ensure that enough liquid is present at the outflow of the tubes of the falling-film evaporator for the formation of a stable liquid film over the total circumference of the evaporator tubes of the falling-film evaporator. In this way, direct contact is avoided between the vapor phase, which contains, for example, glycol, and the heated inner surface of the tubes of the falling-film evaporator.

The liquid stream fed to the falling-film evaporator is thus preferably only partly evaporated. The vapors (the steam) produced flow together with the unevaporated liquid (back) to the column if the bottom of the evaporator is full, and the bottom outflow separate from the bottom of the column is located below the evaporator tubes. The bottom product is removed by means of pump P2 from this separate bottom of the bottom product stream of the unevaporated liquid at the outlet of the bottom evaporator.

Figure 2:
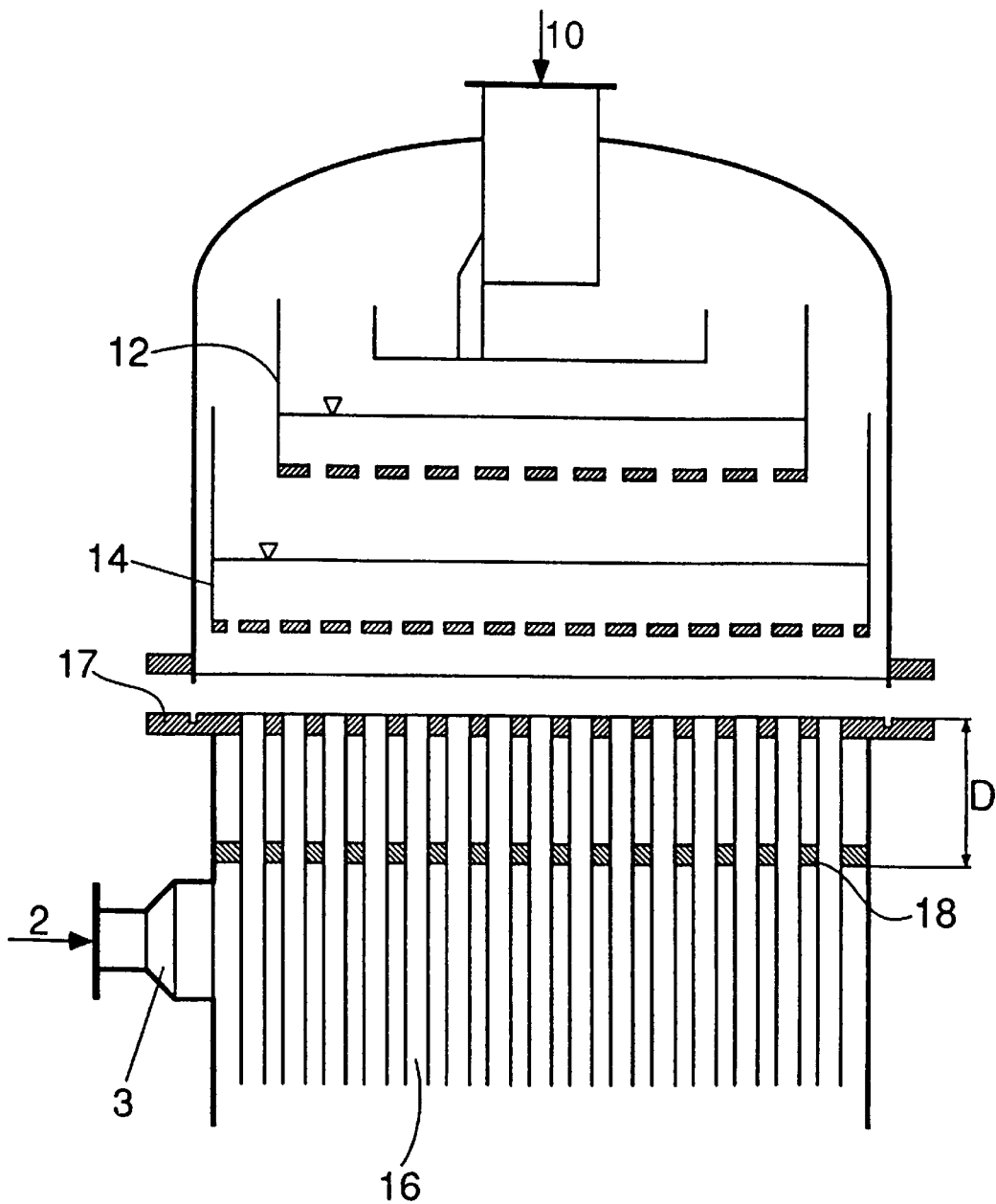
FIG. 2 shows a cross-sectional view of the upper part of the falling-film evaporator with a two-stage perforated box distributor and upper tube plate with intermediate plates.

The liquid fed to the falling-film evaporator W1 must be uniformly distributed over all evaporator tubes 16 in order to ensure the formation of a stable liquid film in all evaporator tubes, as described above. The uniform distribution of the liquid can be achieved, according to the invention, by means of a two-stage perforated box distributor, as shown in FIG. 2.

The liquid to be evaporated is fed via tube 10, after which it is distributed uniformly over the entire entry surface of the evaporator tubes 16 by means of a preliminary distributor 12 and a main distributor 14. The two perforated boxes (preliminary distributor 12 and main distributor 14) must be arranged in such a way that about the same amount of liquid is fed to all evaporator tubes. The liquid then enters the evaporator tubes, down whose walls it trickles, and is partly evaporated. The inflow of liquid is regulated in such a way that not all liquid is evaporated but a stable liquid film is also present at the lower tube end and covers the entire inner surface of the tube.

The energy required for evaporation is supplied by heating steam, which is fed to the falling-film evaporator via the inlet 2, in particular via a steam dome or steam belt 3. Other suitable heat transfer media, for example high-boiling organic compounds, may also be used.

According to an embodiment of the invention, the upper tube plate of the falling-film evaporator is thermally insulated. This ensures that no heated components of the falling-film evaporator are free from a liquid film. The possibility of iron oxide or magnetite particles entrained from upstream units being deposited on the upper tube plate cannot in fact be ruled out. These particles may be at least partly in contact with the vapor phase which, according to an embodiment of the invention, contains glycol, unless the upper tube plate 17 is thermally insulated. Usually, the upper tube plate 17 is in direct contact on its lower side with the heating medium, which is generally steam. To avoid this direct contact, in an embodiment of the invention an intermediate plate 18 is drawn in below the upper tube plate, as shown in FIG. 2. According to an embodiment of the invention, the space between the upper tube plate 17 and the intermediate plate 18 can be filled with a suitable insulating material. The penetration of heating steam into the space between the upper tube plate and the intermediate plate can also be prevented by minimizing the tolerances of the through-holes for the evaporator tubes 16 in the intermediate plate 18, so that there is as far as possible no space between the evaporator tubes 16 and the intermediate plate 18. According to an embodiment of the invention, the distance D between the upper tube plate and the intermediate plate may be 20–200 mm.

According to an embodiment of the invention, it is possible to dispense with the thermal insulation of the upper tube plate if it is ensured by the other measures according to the invention that the heated surfaces of the upper tube plate are always completely covered with a liquid film.

Figure 3:
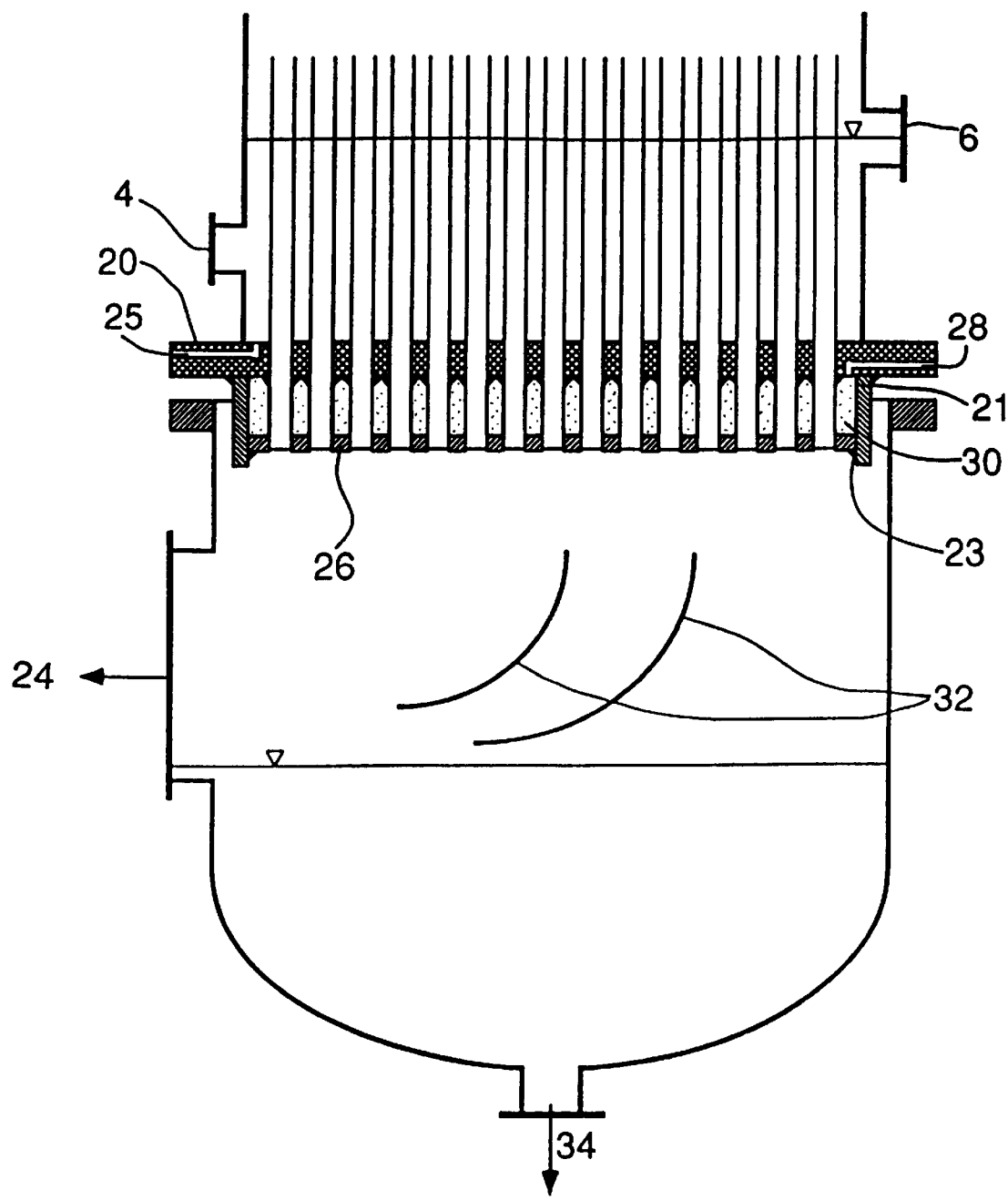
FIG. 3 shows a cross-sectional view of the lower region of the falling-film evaporator with the outlet region for heating medium and product.

According to an embodiment of the invention, the lower tube plate is thermally insulated; according to a further embodiment of the invention, both the upper and the lower tube plates are thermally insulated. The insulation of the lower tube plate is shown in FIG. 3. The evaporator tubes 16 project downward through the lower tube plate 20, preferably to the extent permitted or required by the design of the falling-film evaporator. This may be limited, for example, by the fact that the evaporator tubes have to be welded to the lower tube plate from below as shown in FIG. 3. A circular ring 21 which is connected on the lower side to a cover plate 26 with ring 23 which closes the lower side of the tubes 16 is mounted on the lower side of the lower tube plate. The space between the tubes 16, the lower tube plate 20 and the cover plate 26 can be filled with an insulating material 30. The cover plate 26 shields the insulating material 30 from the vapor phase. As a result of this novel design of the lower tube plate, heating of the cover plate 26 is avoided and hence direct contact of the dry, heated surfaces with vapor phase containing, for example, glycol.

According to a further embodiment of the invention, the space between the lower tube plate 20 and the cover plate 26 is not filled with insulating material 30 but is cooled in a defined manner by flushing with a suitable liquid or a suitable gas, for example with cooling water. For this purpose, the space between the lower tube plate 20 and the cover plate 26 must be sealed all round. The cooling medium can be supplied and removed through orifices 28, as shown in FIG. 3 as a vent orifice for the space.

The novel embodiment of the upper and lower tube plates of the falling-film evaporator, as shown in the Figures, are accordingly applicable to other evaporator designs which can be used according to the invention, for example circulation evaporators, such as natural circulation evaporators or forced circulation evaporators. According to the invention, the insulation is such that direct contact between a heated surface and the vapor phase, for example glycol-containing vapor phase, is minimized.

According to an embodiment of the invention, the largest possible area of tube plate, ie. of the upper and/or lower tube plate, is filled with tubes. The tube plate is preferably fully occupied by tubes in order to provide a very small tube plate surface which could lead to the formation of heated surfaces not wet with a liquid film. For example, according to an embodiment of the invention, it may thus be superfluous additionally to provide thermal insulation to the upper or lower tube plate.

According to an embodiment of the invention, flow deflector plates 32 may be arranged, as shown, for example, in FIG. 3, at the lower tube outlet of the falling-film evaporator for reducing the pressure loss and for shielding the liquid surface in the bottom of the evaporator. The vapors, ie. the steam, are fed to a column K1 via a connection 24. The bottom product of the evaporator can be taken off via the connection 34 by means of pump P2.

The falling-film evaporator W1 can be operated with any suitable heat medium. For energy reasons, it is preferably operated with steam, if necessary with superheated steam under superatmospheric pressure. If the heating medium used is steam, which is also referred to as heating steam, the momentum of the heating steam can be broken outside the falling-film evaporator in a steam dome or steam belt (3). To protect the evaporator from erosion by liquid drops entrained in the steam, a slat blind for protecting the evaporator tubes may additionally be arranged on the feed side of the heating steam.

To avoid the formation of iron oxide or magnetite particles, the falling-film evaporator is made of stainless steel, for example of stainless steel 1.4541 or an equivalent steel.

The evaporator used according to the invention, in particular the falling-film evaporator shown in the Figures, is fed with liquid to be evaporated, in such a way that a stable liquid film is formed over the total tube length in the falling-film evaporator. For this purpose, the amount of liquid stream fed from the column K1 by means of pump P1 can be appropriately controlled, as can the temperature of the heating medium and the pressure on the vapor side of the falling-film evaporator. According to the invention, reduced pressure can be employed for evaporating high-boiling substances, in particular for evaporating liquids containing ethylene glycol.

The effect of the contact between the vapor of the vaporizable oxidation-sensitive compound and iron or iron oxide particles, in particular magnetite particles, which forms the basis of the present invention, is illustrated in the Examples below.

EXAMPLE 1

The effect of different materials in the distillation apparatus on the oxidation of ethylene glycol, ie. the aldehyde formation, was investigated in laboratory experiments. Distillation experiments with ethylene glycol were first carried out for this purpose.

The simple distillation apparatus used consisted of a still with an air leak tube, a packed column (length 40 cm, diameter 2.5 cm), an ascending condenser, a receiver and an apparatus for generating reduced pressure. Ethylene glycol was initially taken in the still and distilled at 200 mbar at a temperature of 150–160° C. in the bottom. The distillation was terminated when 87% of the initial bottom content had been distilled, ie. 13% of bottom product remained behind. The duration of the experiment was about 2 hours. The column contained packing. Rings of glass, stainless steel or iron were used as packing in various experiments. Either air or nitrogen was bubbled in via the air leak tube. The results are summarized in the Table below, the numerical values indicating the content of aldehyde in the distillate or bottom product in ppm (parts per million).

TABLE 1

Distillation of ethylene glycol over various column packings

| Initial values Aldehyde | | Packing | | | | | |
|---|---|---|---|---|---|---|---|
| Free: 15 ppm | | Glass | | Iron | | Stainless steel | |
| Total: 22 ppm | | free | total | free | total | free | total |
| Distillate | | 27 | 38 | 42 | 53 | 10 | 24 |
| Air | Bottom | <5 | 51 | 30 | 55 | <5 | 67 |
| Balance | product | | | | | | |
| | | 24 | 40 | 40 | 53 | 9 | 30 |
| Distillate | | 14 | 25 | 24 | 30 | 9 | 18 |
| Nitrogen | Bottom | <5 | 57 | 12 | 52 | <5 | 64 |
| Balance | product | | | | | | |
| | | 13 | 29 | 22 | 33 | 8 | 24 |

The aldehyde concentrations were determined by the MBTH method, as described in E. Savicky et al., Analyt. Chem. 33 (1961), 93–96. This method is used for the photometric determination of free and bound aldehydes. The difference between free and total aldehyde is the bound aldehyde, which in the present case is in the form of, for example, acetals and hence not accessible to direct determination.

The stated balances give the respective average total aldehyde contents in the ethylene glycol, the bottom product/distillate ratio of 13:87 being employed.

The Table shows that, when air was bubbled in, a high level of aldehyde formation occurred for all packings used.

In addition, aldehyde formation is highest when iron rings are used as packing and lowest when stainless steel rings are employed as packing. The choice of the material for the packing thus has an effect on the formation of aldehyde in the distillation of ethylene glycol. The presence of iron rings as packing promotes the formation of aldehyde from ethylene glycol. The formation of a grainy, readily mobile black deposit was observed on the iron rings as packings during the distillation, wherein the stainless steel rings were only tarnished.

EXAMPLE 2

In a further experiment, ethylene glycol was refluxed in the apparatus described above, under otherwise identical conditions. Thus, no ethylene glycol was distilled off. This made it possible to establish contact between vapor phase and tested material as packing for a relatively long period.

In this experiment, the column was run either as an empty glass column or as a glass column operated with iron turnings. This served to simulate an iron reflux condenser or a corresponding evaporator of this material with gas phase contact. The results of the experiments are shown in Table 2, the total aldehyde content in each case being stated in ppm.

The initial concentration of aldehyde in this case was 23 ppm.

TABLE 2

| No. | Packing | Time [h] | Atmosphere | Aldehyde [ppm] |
|---|---|---|---|---|
| 1 | Iron turnings | 13 | Air | 162 |
| 2 | Iron turnings | 14 | Air | 180 |
| 3 | Iron turnings | 12 | Nitrogen | 40 |
| 4 | Control experiment without iron turnings | 20 | Air | 38 |

The aldehyde contents determined show that the oxidation of ethylene glycol in the presence of air over an iron surface takes place to a substantially greater extent than in corresponding control experiments in the empty glass column (experiment No. 4) or under a nitrogen atmosphere (experiment No. 3). Owing to the longer residence or contact times, the effect of the material used in the condenser or the column is much more pronounced than in the preceding Example. The Example shows that the contact of the vapor phase with iron leads to substantially increased formation of aldehyde as an oxidation product of the ethylene glycol.

EXAMPLE 3

As a further comparative experiment, ethylene glycol was refluxed in the apparatus described above, an empty glass column being used. The atmosphere used was air. During refluxing, iron turnings or steel rings comprising V2A stainless steel were initially taken in the bottom and were completely covered by the bottom product, ie. could not come into contact with the gas phase.

The aldehyde content of the bottom product was 23 ppm at the beginning of the experiment. The Table below shows the total aldehyde values measured after an experimental time of 20 hours.

TABLE 3

| No. | Material | Atmosphere | Aldehyde [ppm] |
|---|---|---|---|
| 1 | Glass | Air | 38 |
| 2 | Iron | Air | 39 |
| 3 | V2A stainless steel | Air | 37 |

The measured aldehyde contents at the end of the experiment clearly show that iron or steel which is present in the bottom product of the distillation but cannot come into contact with the gas phase has no significant effect on the oxidation of ethylene glycol to aldehyde. When immersed iron or steel was used, the concentration of aldehyde did not change in comparison with the empty glass apparatus. Thus, it is clear that the increased aldehyde formation during evaporation of ethylene glycol takes place in the gas phase.

EXAMPLE 4

Comparative Example

In an industrial plant for the production of ethylene glycol, a conventional falling-film evaporator which was produced from carbon-containing steel was used for evaporating the resulting ethylene glycol/water mixture. During operation of the evaporator, the aldehyde contents of the evaporation product increased to above 50 ppm.

EXAMPLE 5

In the industrial process for the production of ethylene glycol according to Example 4, the conventional falling-film evaporator was replaced by a falling-film evaporator as described above as a preferred embodiment. The arrangement corresponds to the arrangements shown in FIGS. 1–3. The falling-film evaporator consisted of stainless steel 1.4541. The falling-film evaporator was operated by a procedure with separate bottom. The amount of liquid fed to the falling-film evaporator was adjusted so that sufficient liquid was present at the outflow of the tubes of the falling-film evaporator to form a stable liquid film over the total circumference of the evaporation tubes of the falling-film evaporator. According to the invention, the uniform distribution of the liquid was achieved by means of the two-stage evaporated box distributor, as shown in FIG. 2. The energy required for evaporation was supplied by heating steam. In the falling-film evaporator used, the lower tube plate was thermally insulated, as described in detail above. The space between the tubes, the lower tube plate and the cover plate was filled with an insulating material. In the falling-film evaporator used according to the invention, the tube plate was fully occupied by tubes.

In the evaporator, flow deflector plates were arranged at the lower tube outlet, as shown in FIG. 3.

The use of the novel falling-film evaporator led to an aldehyde content which remained below 10 ppm even when the process was carried out over a long period.

The experimental results indicated above clearly show that the oxidation of the oxidation-sensitive compound can be greatly reduced by preventing direct contact between a resulting vapor phase of a vaporizable oxidation-sensitive compound and a heated solid surface present in the evaporator. This can be achieved in particular if the total heated solid surface is in contact with the liquid to be evaporated. According to an embodiment of the invention, preventing contact with iron or iron oxide particles, such as magnetite particles, present in the system leads to more effective evaporation with a lower level of formation of oxidation products.

We claim:

1. A process for the purification of a glycol, wherein a liquid containing the glycol is evaporated in an evaporator in which the liquid is brought into contact with a heated solid surface in the evaporator for evaporation, wherein essentially the total heated solid surface is completely wet with the liquid, the inflow of the liquid into the evaporator being regulated such that not all of the liquid is evaporated so that a stable film of the liquid is present on said heated solid surface covering essentially the entire surface, wherein essentially the total heated solid surface is brought into contact with the liquid by adjustment of the liquid fed to the evaporator and by uniform liquid distribution at the inlet into the evaporator, whereby the oxidation of the glycol to be evaporated is essentially avoided.

2. A process as claimed in claim 1, wherein the glycol is ethylene glycol, and the liquid contains water.

3. A process as claimed in claim 1 wherein the uniform liquid distribution is by means of a perforated box distributor.

4. A falling film evaporator for the purification of glycol containing liquids comprising (a) a lower section which includes a heatable solid surface (16) of evaporator tubes and means (2, 3) for heating the evaporator tubes, wherein the evaporator tubes are separated from each other by a first ring means (21) and second ring means (23), with an insulating material (30) between said first ring means and said second ring means which shields the insulating material from contact with any vapor present in the evaporator during its operation, (b) an upper section comprising the means for feeding a liquid containing glycol to the evaporator tubes which comprises at least one perforated box distributor (12, 14), connected in series and arranged in the evaporator in such a way that essentially all of the total heating surface of the evaporator tubes is In contact with the liquid during operation, and (c) means for thermally insulating the tube plates in the upper and lower sections.

5. An evaporator as claimed in claim 4, wherein the heatable solid surface (16) consists of corrosion-resistant steel.

6. The falling film evaporator of claim 4 wherein at least the heated solid surface of the evaporator is stainless steel.

* * * * *